United States Patent
Ohse et al.

(10) Patent No.: US 11,029,217 B2
(45) Date of Patent: Jun. 8, 2021

(54) RAPID RESPONSE SENSOR HOUSING

(71) Applicant: Watlow Electric Manufacturing Company, St. Louis, MO (US)

(72) Inventors: Jeremy Ohse, St. Louis, MO (US); Graham Fischer, Richmond, IL (US); Ryan Affara, Richmond, IL (US)

(73) Assignee: Watlow Electric Manufacturing Company, St. Louis, MO (US)

( * ) Notice: Subject to any disclaimer, the term of this patent is extended or adjusted under 35 U.S.C. 154(b) by 0 days.

(21) Appl. No.: 16/746,150

(22) Filed: Jan. 17, 2020

(65) Prior Publication Data
US 2020/0149977 A1    May 14, 2020

Related U.S. Application Data

(63) Continuation of application No. 14/922,075, filed on Oct. 23, 2015, now Pat. No. 10,571,343.

(60) Provisional application No. 62/068,596, filed on Oct. 24, 2014.

(51) Int. Cl.
| | | |
|---|---|---|
| *G01K 7/16* | (2006.01) | |
| *G01K 1/08* | (2021.01) | |
| *G01K 13/02* | (2021.01) | |

(52) U.S. Cl.
CPC .............. *G01K 7/16* (2013.01); *G01K 1/08* (2013.01); *G01K 13/02* (2013.01)

(58) Field of Classification Search
CPC ............ G01K 7/16; G01K 1/08; G01K 13/02; G01K 1/14; G01K 1/16; G01D 11/245; G01D 11/30; G01D 11/24; G01J 5/04; G01J 5/02; H01C 7/008; H01C 7/006; H01C 13/02; H01C 1/01; H01C 1/014; H01G 4/224
See application file for complete search history.

(56) References Cited

U.S. PATENT DOCUMENTS

| | | | | |
|---|---|---|---|---|
| 6,341,892 B1* | 1/2002 | Schmermund | ........... | G01K 1/08 338/22 R |
| 8,935,843 B2* | 1/2015 | Boguhn | ................. | G01F 1/684 29/521 |
| 2009/0174520 A1* | 7/2009 | Wada | ..................... | H01C 7/006 338/25 |

FOREIGN PATENT DOCUMENTS

JP           S62042341           10/1987

OTHER PUBLICATIONS

Aviation Metrology Technology, Chapter 3 Thermal Measurement, Section 3.3.2 Surface Temperature Measurement, Aviation Industry Press, Dec. 31, 2013, pp. 83-84, Beijing Great Wall Metrology and Testing Technology Institute.

* cited by examiner

*Primary Examiner* — Gail Kaplan Verbitsky
(74) *Attorney, Agent, or Firm* — Burris Law, PLLC

(57) ABSTRACT

A sensor assembly includes a housing having a body having a distal end portion defining an internal cavity and a proximal end portion defining a plurality of internal passageways. A micro-sensor is disposed within the internal cavity and exposed to the outside environment and an internal wall separates the internal cavity from the plurality of internal passageways. The micro-sensor abuts the internal wall.

14 Claims, 7 Drawing Sheets

RAPID RESPONSE SENSOR HOUSING

CROSS-REFERENCE TO RELATED APPLICATIONS

This application is a continuation of U.S. patent application Ser. No. 14/922,075, filed on Oct. 23, 2015, which claims priority to and the benefit of U.S. Provisional Patent Application No. 62/068,596, filed on Oct. 24, 2014. The disclosures of the above applications are incorporated herein by reference.

FIELD

The present disclosure relates to temperature sensors, and more particularly to small temperature sensors and their packaging.

BACKGROUND

The statements in this section merely provide background information related to the present disclosure and may not constitute prior art.

Temperature sensors are used in a variety of applications and are often employed in environments that demand high accuracy and a fast response time, such as semiconductor processing. Additionally, these temperatures sensors must be provided in relatively small packages in order to reduce their thermal impact on the specific application. Some temperature sensors are generally provided in extremely small packages, on the order of less than 0.25" in length and less than 0.10" in diameter, and with extremely tight manufacturing tolerances. These small temperature sensors are often difficult to manufacture and must be protected from damage by protective covers and other materials, which tend to decrease the response time and accuracy of the sensors.

SUMMARY

This section provides a general summary of the disclosure and is not a comprehensive disclosure of its full scope or all of its features.

In a form, the present disclosure provides a sensor assembly including a housing formed of a one-piece member having an internal cavity exposed to an outside environment and a plurality of internal passageways separated by an intermediate wall of the one-piece member. The plurality of internal passageways extend and open into the internal cavity. A thin film resistive device (RTD) is disposed within the internal cavity and exposed to the outside environment and has a pair of lead wires that extend from the thin film RTD through the plurality of internal passageways. An internal wall separates the internal cavity from the internal passageways, and the thin film RTD abuts the internal wall.

In a variation, the internal cavity defines at least one surface that geometrically matches a contact surface of the thin film RTD. In other such variations, at least one surface of the internal cavity and the contact surface of the thin film RTD are flat.

In another variation, the thin film RTD is secured in the internal cavity by a thermal adhesive. In another such variation, the thermal adhesive, the housing, and a substrate of the thin film RTD have a matched coefficient of thermal expansion.

In yet another variation, the internal cavity and the internal passageways define a rectangular geometry.

In a further variation, the internal cavity defines a rectangular geometry. In a further such variation, the rectangular internal passageways define arcuate end portions.

In a yet further variation, the internal cavity defines a geometry that matches an outer geometric periphery of the thin film RTD.

In a further still variation, at least one surface of the internal cavity defines a geometry that matches a contact surface of the thin film RTD. In a further still such variation, the at least one surface of the internal cavity and the contact surface of the thin film RTD are flat.

In an additional variation, a diameter of the lead wires increases as the lead wires extend through the internal passageways.

In another form, a sensor assembly includes a housing formed of a unitary body and having an internal cavity exposed to an outside environment and a plurality of internal passageways separated by an intermediate wall of the unitary body. The plurality of internal passageways extend and open into the internal cavity. A micro-sensor is disposed within the internal cavity and exposed to the outside environment and has a pair of lead wires that extend from the micro-sensor through the plurality of internal passageways. An internal wall separates the internal cavity from the internal passageways, and the micro-sensor abuts the internal wall.

In a variation, the micro-sensor is secured within the internal cavity by a thermal adhesive. In other such variations, the thermal adhesive, the housing, and a substrate of the micro-sensor have a matched coefficient of thermal expansion.

In another variation, the internal cavity defines at least one surface that geometrically matches a contact surface of the micro-sensor.

In a further variation, the internal cavity defines a rectangular geometry.

In yet another form, a housing having a one-piece member for use in positioning a micro-sensor includes an internal cavity exposed to an outside environment and a plurality of internal passageways separated by an intermediate wall of the one-piece member. The plurality of internal passageways extend and open into the internal cavity, and the internal cavity defines at least one surface that geometrically matches a contact surface of the micro-sensor. An internal wall separates the internal cavity from the internal passageways, and the internal wall is configured to receive the micro-sensor for proper positioning within the housing.

In a variation, the micro-sensor is secured within the internal cavity by a thermal adhesive. In other such variations, the thermal adhesive, the housing, and a substrate of the micro-sensor have a matched coefficient of thermal expansion.

The present disclosure further provides a housing for use in positioning a micro-sensor, the housing comprising a body having a distal end portion being open and defining an internal cavity exposed to an outside environment, a proximal end portion defining a plurality of internal passageways that open into the internal cavity, and an internal wall separating the internal cavity from the internal passageways, wherein the micro-sensor abuts the internal wall. At least one surface of the internal cavity defines a geometry that matches a contact surface of the micro-sensor.

In one form, the surface of the internal cavity and the contact surface of the micro-sensor are flat.

In another form, the housing further comprises a thermal adhesive configured to secure the micro-sensor within the internal cavity, the thermal adhesive having a matched coefficient of thermal expansion with that of the distal end portion and a substrate of the micro-sensor.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
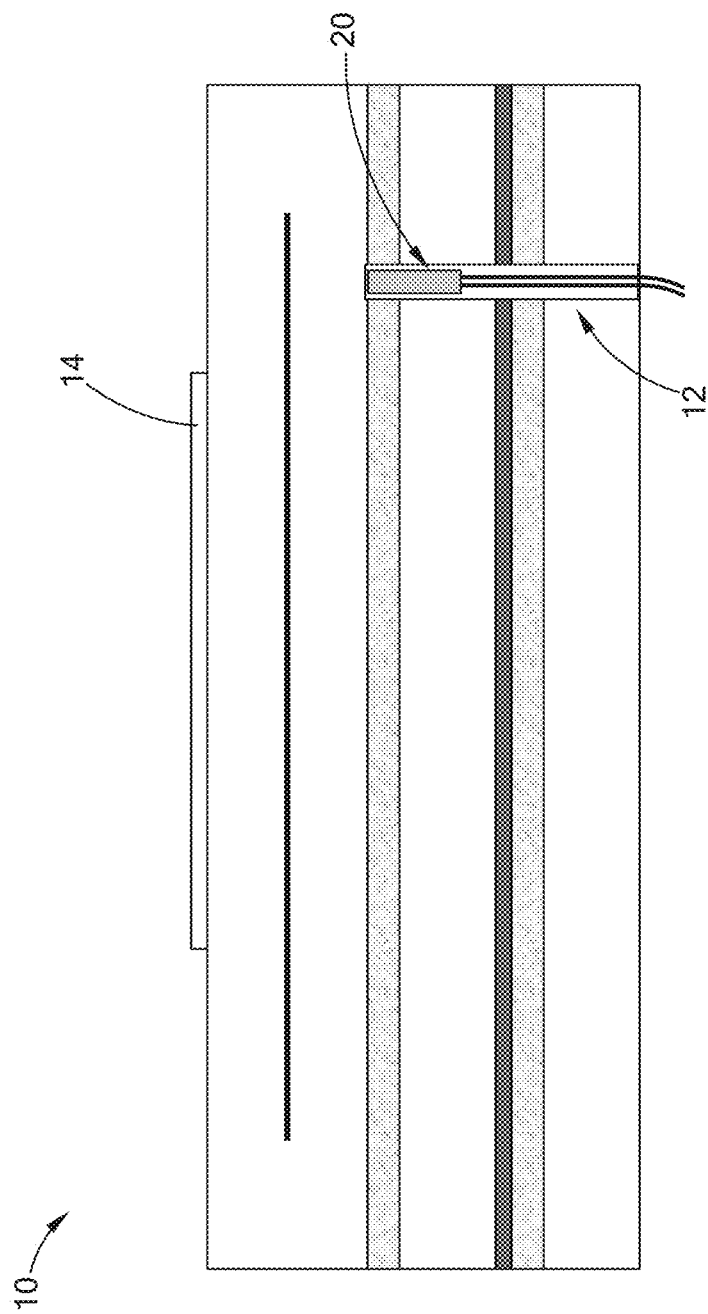
FIG. 1 is a cross-sectional view of one form of the sensor assembly disposed within a semiconductor processing environment and constructed in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, a sensor assembly according to the present disclosure is illustrated and generally indicated by reference numeral 20, and is disposed within an exemplary semiconductor application having a chuck assembly 10. The sensor assembly 20, in one form, is disposed within a via 12 that extends through various members of the chuck assembly 10, in order to sense the temperature of a target, such as by way of example, a substrate 14.

Figure 2:
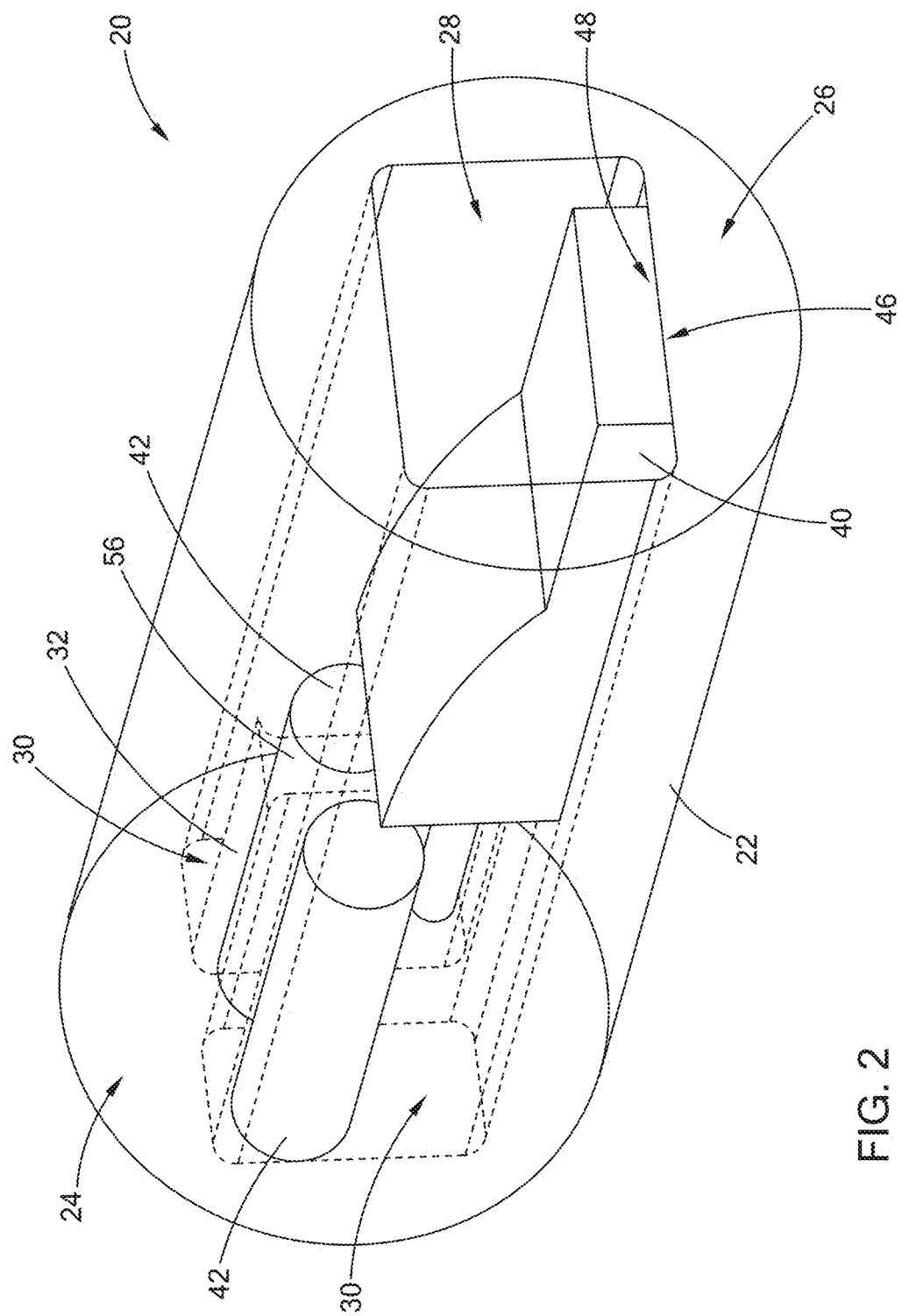
FIG. 2 is a perspective view of one form of a sensor assembly constructed in accordance with the teachings of the present disclosure.
Figure 3:
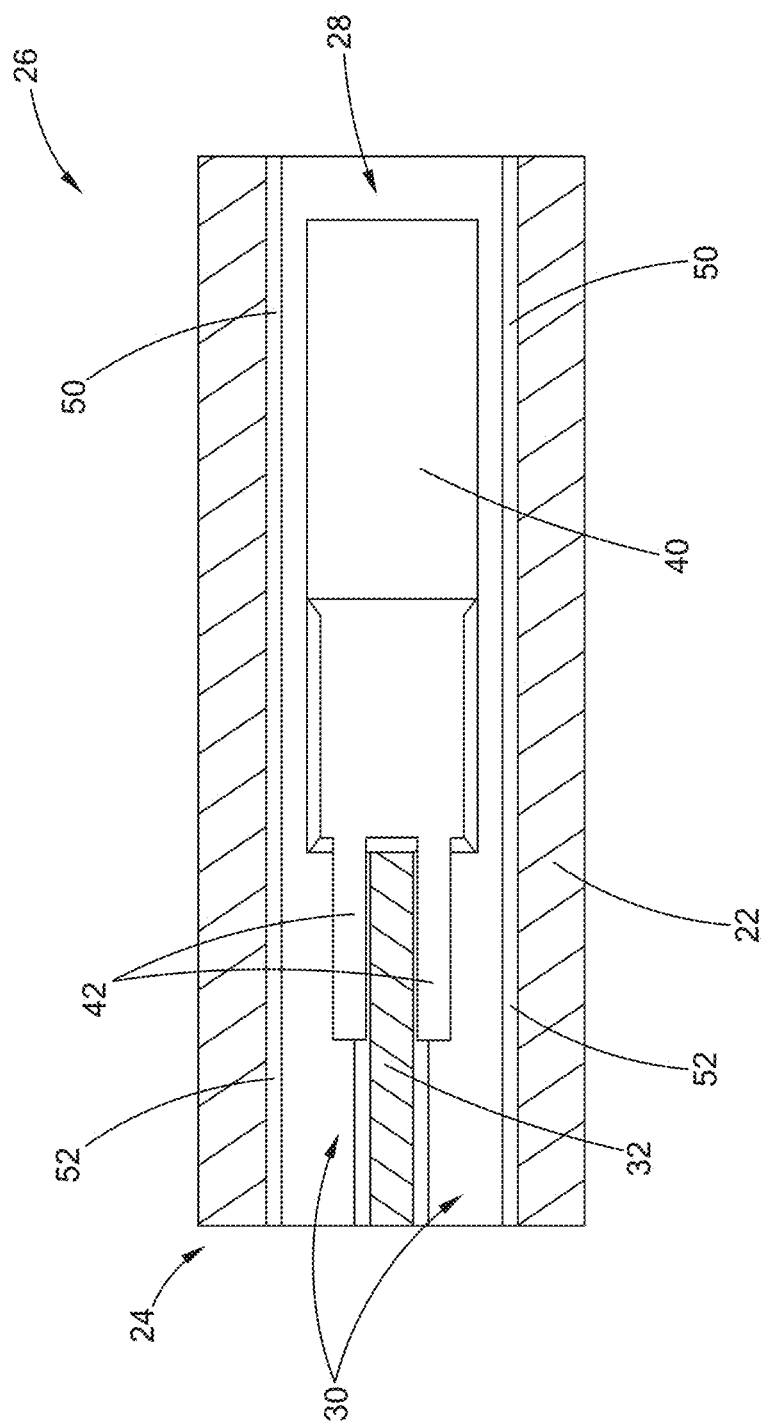
FIG. 3 is a cross-sectional view of the sensor assembly of FIG. 2, taken along line 3-3 of FIG. 2.

Referring now to FIGS. 2 and 3, the sensor assembly 20 generally comprises a housing 22 that in one form is a unitary body, or a one-piece member. (It should be understood, however, that the housing 22 may be provided in multiple pieces or parts while remaining within the scope of the present disclosure). The housing 22 defines a proximal end portion 24 and a distal end portion 26, and the distal end portion 26 in one form is open, or exposed, to an outside environment as shown. The distal end portion 26 defines an internal cavity 28 that is also exposed to the outside environment. The proximal end portion 24 defines a plurality of internal passageways 30 that extend and open into the internal cavity 28. As further shown, the plurality of internal passageways 30 are separated by an intermediate wall 32. Although only two internal passageways 30 are shown, it should be understood that any number of passageways, including three (3) and four (4) passageways to accommodate a 3-wire or 4-wire RTD, may be employed while remaining within the scope of the present disclosure.

A micro-sensor, which in this form is a thin film resistive temperature device (RTD) 40, is disposed within the internal cavity 28. The thin film RTD 40 is oriented as shown and also exposed to the outside environment for increased tip sensitivity. The thin film RTD 40 includes a plurality of lead wires 42 that extend from the thin film RTD 40 through the plurality of internal passageways 30, and the thin film RTD 40 is in contact with at least one wall 42 of the internal cavity 28. The lead wires 42 that extend from the thin film RTD, in one form, are a smaller diameter and then transition to a larger diameter as they extend through the internal passageways 30 as shown. In one form, the lead wires 42 transition from 0.15 mm to 0.40 mm.

The thin film RTD 40 and the lead wires 42 are secured within the housing 22 by a thermal adhesive, also referred to as a potting compound, having a matched coefficient of thermal expansion with that of the housing 22 and a substrate of the thin film RTD 40. (The substrate of the thin film RTD 40 is generally the outer casing as shown, with the RTD element inside, which in this form is a ceramic casing/substrate and a platinum resistance element). In one form, the housing 22 is alumina, and the thermal adhesive is alumina based, along with the substrate 41. Alternately, a glass adhesive is used to secure the thin film RTD 40 and the lead wires 42 within the housing 22. The glass adhesive generally provides good heat transfer and may be a material such as borosilicate. Overall, the thermal adhesive is provided for thermal conductivity, adhesion, and strain relief of the internal components (thin film RTD 40 and lead wires 42).

As used herein, the term "micro-sensor" shall be construed to mean extremely small sensors, such as a thin film RTD or a sensor employing nano particles, by way of example. Such micro-sensors have a size on the order of approximately 10 mm in length by approximately 2 mm in diameter, with relatively tight manufacturing tolerances, on the order of ±0.2 mm. Accordingly, the present disclosure should not be construed as being limited to only thin film RTDs and may include other types of micro-sensors, either for temperature or other environmental sensing, such as by way of example, pressure or humidity.

Additionally, the term "thermal adhesive" shall be construed to mean a material or compound that secures components and with the desired heat transfer characteristics. A thermal adhesive may include a potting compound, glass, or other material that both bonds and transfers heat according to application requirements.

As shown in FIG. 2, the sensor assembly the internal cavity 28 defines at least one surface 46 that geometrically matches a contact surface 48 of the thin film RTD 40, which in this form is flat. This geometric matching provides for improved heat transfer, repeatability, and response time of the thin film RTD 40. It should be understood that other geometric profiles other than flat may be employed, depending on the shape of the micro-sensor and the response time/accuracy desired. Such profiles may include, by way of example, arcuate or polygonal profiles, which are set forth below in greater detail.

Figure 4B:
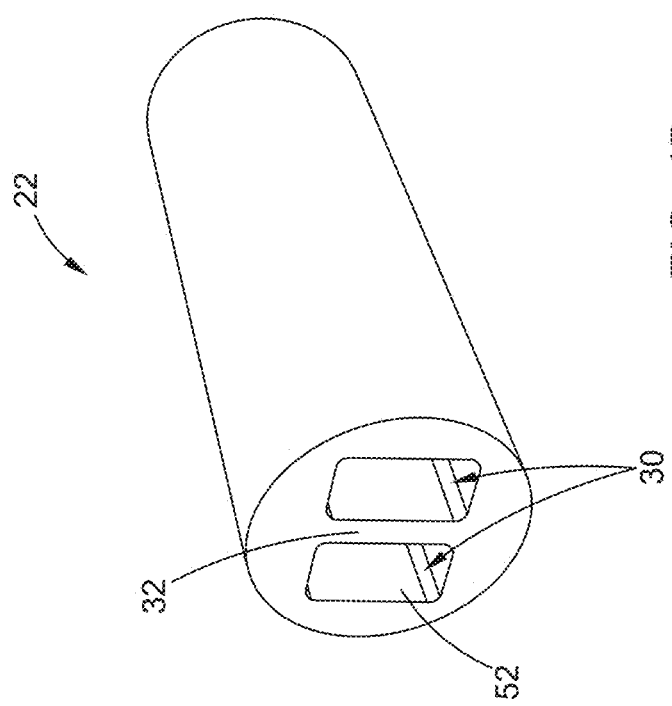
FIG. 4B is a proximal perspective view of a housing of FIG. 4A.
Figure 4A:
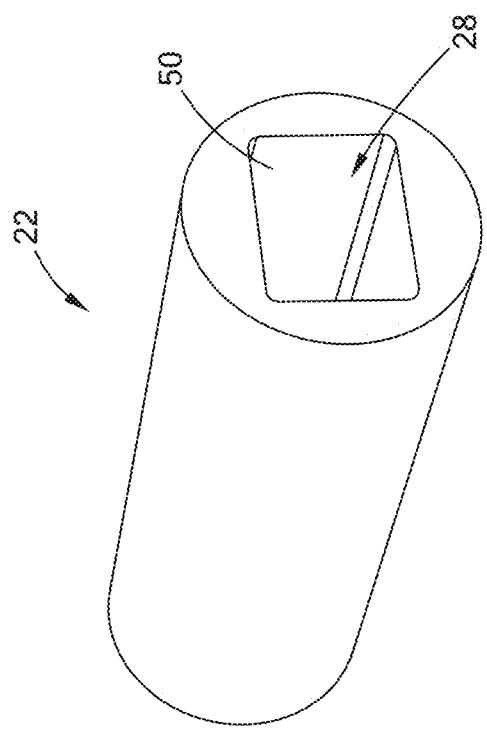
FIG. 4A is a distal perspective view of a housing of the sensor assembly constructed in accordance with the teachings of the present disclosure.
Figure 5:
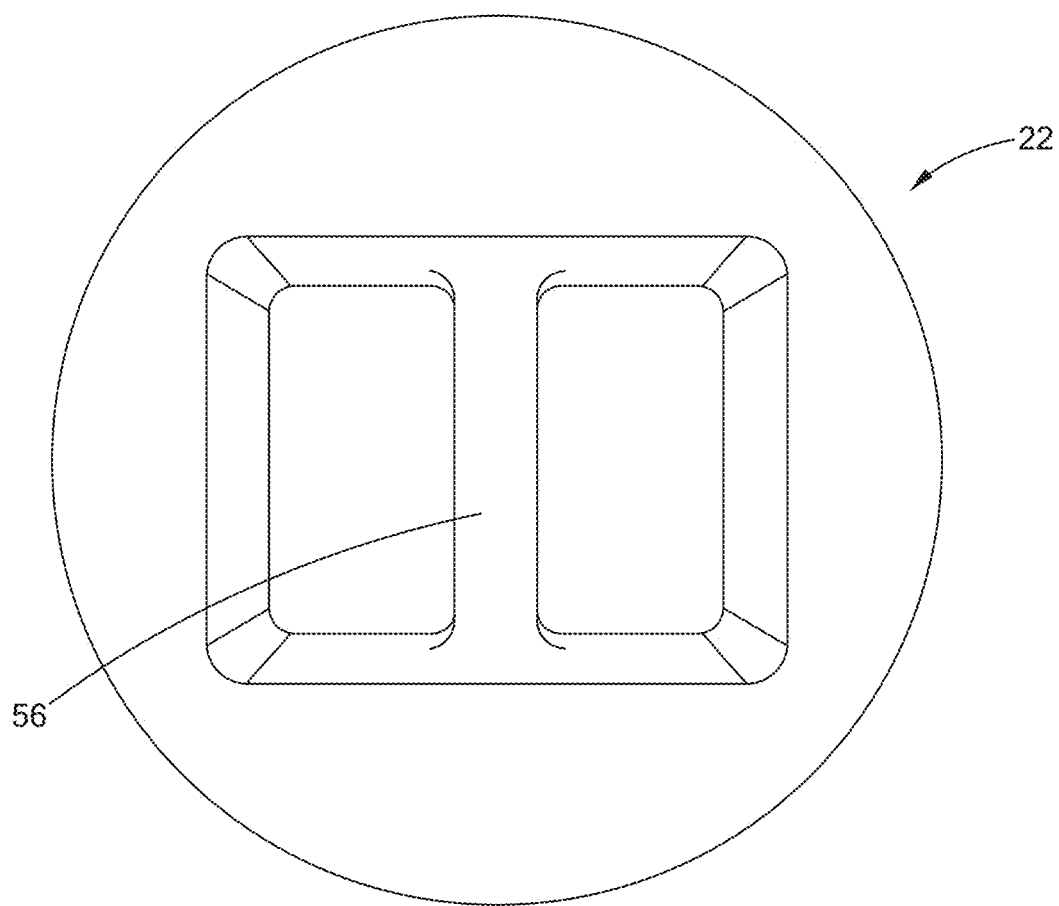
FIG. 5 is a side view from the distal end portion of the housing of FIG. 4A.

Referring now to FIGS. 4A-B and 5, the internal cavity 28 the internal passageways 30 in this form define a rectangular geometry. The internal cavity 28 defines two lateral opposed walls 50 that extend proximally to further define outer walls 52 of the internal passageways 30, which is also shown in FIG. 3. In this form, manufacturability of the housing 22 is improved. Additionally, the internal passageways 30 are separated by the intermediate wall 32 for electrical isolation of the lead wires 42. As further shown, an internal wall 56 (FIGS. 2 and 5) separates the internal cavity 28 from the internal passageways 30, wherein the thin film RTD 40 in one form abuts the internal wall 56 or proper positioning within the housing 22.

Figure 6B:
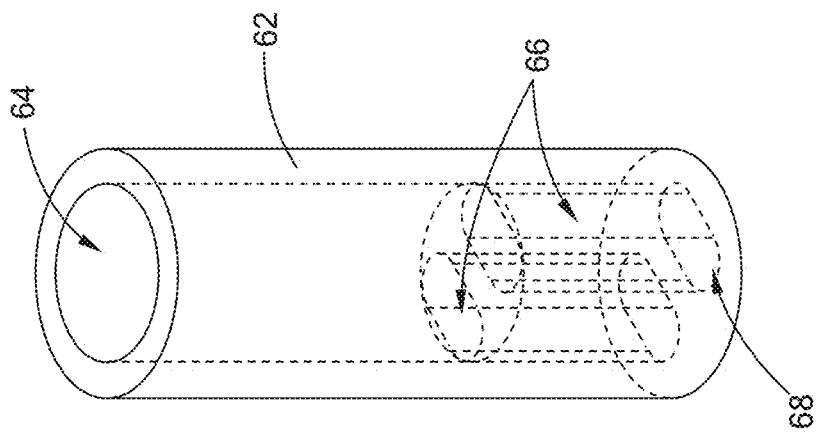
FIG. 6B is a perspective view of the housing of FIG. 6A.
Figure 6A:
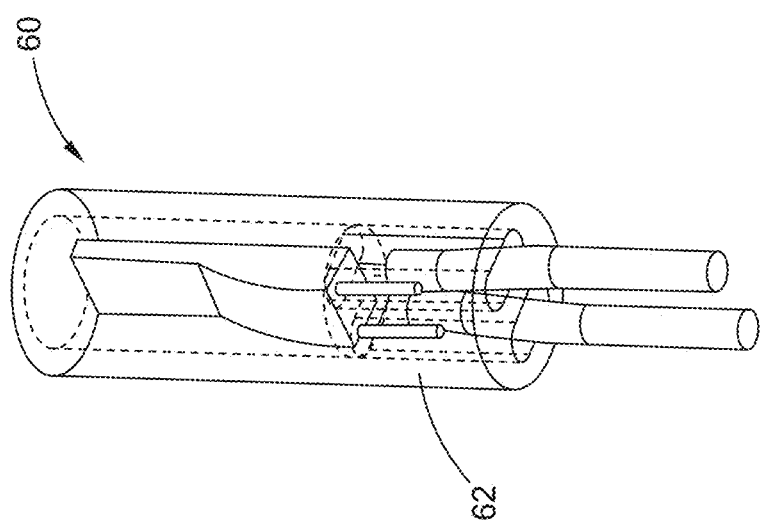
FIG. 6A is a perspective view of another form of a sensor assembly and housing constructed in accordance with the teachings of the present disclosure.

Referring to FIGS. 6A and 6B, another form of a sensor assembly is illustrated and generally indicated by reference numeral 60. In this form, the sensor assembly 60 includes a housing 62 that defines an internal cavity 64 that is cylindrical, and internal passageways 66 that are rectangular with arcuate end portions 68 as shown, or an oval shape. It should be understood that any number of shapes for the internal cavity and internal passageways of the housing may be employed while remaining within the scope of the present disclosure, and thus the illustration of rectangular/oval and cylindrical geometries herein should not be construed as limiting the scope of the present disclosure.

Figure 7:
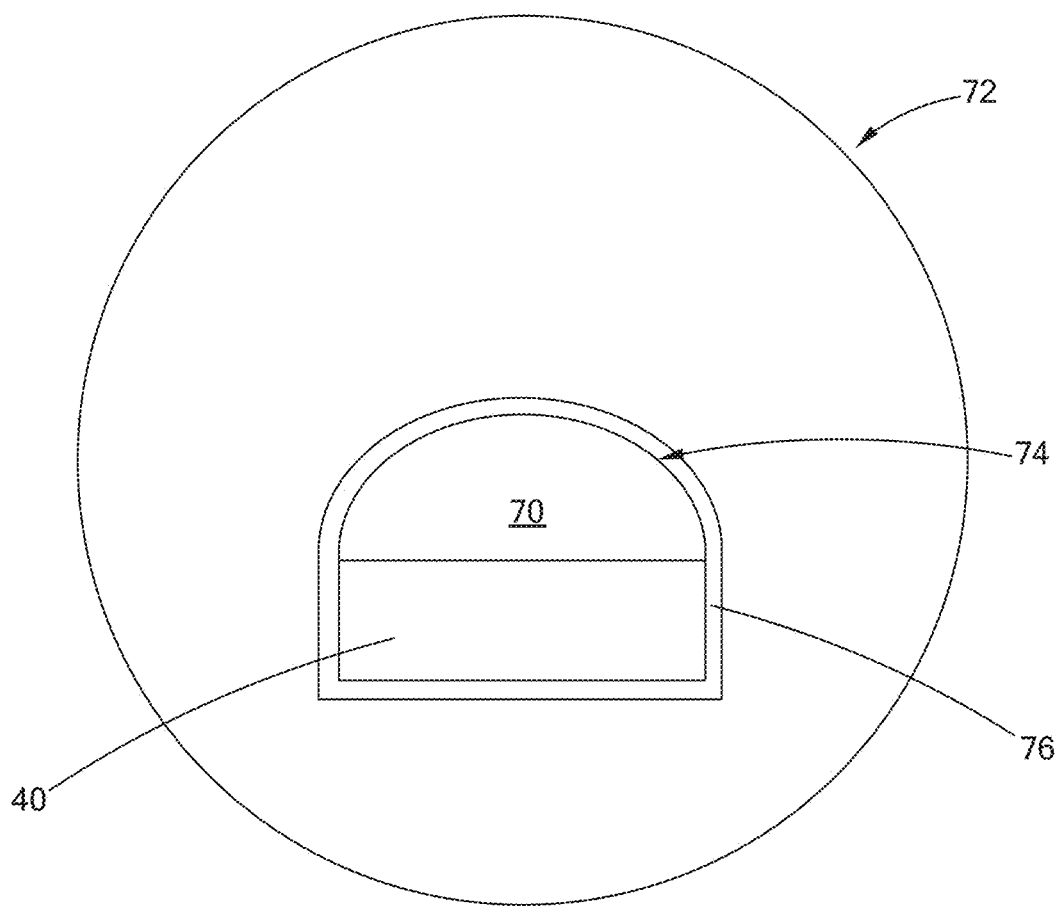
FIG. 7 is a distal end view of another form of a housing with a micro-sensor disposed therein and constructed in accordance with the teachings of the present disclosure.

As shown in FIG. 7, in another form, an internal cavity 70 of a housing 72 defines a geometry that matches an outer geometric periphery 74 of the thin film RTD 40, with a relatively thin layer of thermal adhesive 76 there between. In this form, response time and accuracy are improved even further. Accordingly, a variety of shapes for both the internal cavity and internal passageways may be provided according to the geometry of the micro-sensor being used and the application requirements.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A sensor assembly comprising:
   a housing comprising a unitary body having an internal cavity exposed to an outside environment, a plurality of internal passageways separated by an intermediate wall of the unitary body, the plurality of internal passageways extending and opening into the internal cavity;
   a micro-sensor disposed within the internal cavity and exposed to the outside environment, the micro-sensor having a pair of lead wires that extend from the micro-sensor through the plurality of internal passageways; and
   an internal wall separating the internal cavity from the internal passageways, wherein the micro-sensor abuts the internal wall.

2. The sensor assembly according to claim 1, wherein the micro-sensor is secured within the internal cavity by a thermal adhesive.

3. The sensor assembly according to claim 2, wherein the thermal adhesive, the housing and a substrate of the micro-sensor have a matched coefficient of thermal expansion.

4. The sensor assembly according to claim 1, wherein the internal cavity defines at least one surface that geometrically matches a contact surface of the micro-sensor.

5. The sensor assembly according to claim 1, wherein the internal cavity defines a rectangular geometry.

6. The sensor assembly according to claim 1, wherein the micro-sensor comprises a thin film resistive temperature device (RTD).

7. The sensor assembly to claim 4, wherein the at least one surface of the internal cavity and the contact surface of the micro-sensor are flat.

8. The sensor assembly according to claim 1, wherein the internal passageways define arcuate end portions.

9. The sensor assembly according to claim 1, wherein the internal cavity defines a geometry that matches an outer geometric periphery of the micro-sensor.

10. The sensor assembly according to claim 1, wherein at least one surface of the internal cavity defines a geometry that matches a contact surface of the micro-sensor.

11. The sensor assembly according to claim 1, wherein a diameter of the lead wires increases as the lead wires extend through the internal passageways.

12. A housing for use in positioning a micro-sensor, the housing comprising a one-piece member comprising:
    an internal cavity exposed to an outside environment;
    a plurality of internal passageways separated by an intermediate wall of the one-piece member, the plurality of internal passageways extending and opening into the internal cavity, the internal cavity defining at least one surface that geometrically matches a contact surface of the micro-sensor; and
    an internal wall separating the internal cavity from the internal passageways, wherein the internal wall is configured to receive the micro-sensor for proper positioning within the housing.

13. The housing according to claim 12, wherein the micro-sensor is secured within the internal cavity by a thermal adhesive.

14. The housing according to claim 13, wherein the thermal adhesive, the housing and a substrate of the micro-sensor have a matched coefficient of thermal expansion.

* * * * *